United States Patent [19]

Appenzeller et al.

[11] 3,853,313

[45] Dec. 10, 1974

[54] WAFER INTERLOCKING TRANSPORT SYSTEM

[75] Inventors: Henry Albert Appenzeller, Wallkill; Joseph Charles Miller; Vincent Shea, both of Poughkeepsie, all of N.Y.

[73] Assignee: International Business Machines Corporation, Armonk, N.Y.

[22] Filed: Sept. 17, 1973

[21] Appl. No.: 398,292

Related U.S. Application Data

[62] Division of Ser. No. 309,408, Nov. 24, 1972, Pat. No. 3,786,660.

[52] U.S. Cl. .................................... 269/21, 269/311

[51] Int. Cl. ............................................ B25b 11/00

[58] Field of Search .......... 51/235, 324; 269/20, 21, 269/22, 24, 296, 297, 298, 299, 301, 309, 310, 311, 321 W, 289; 279/4, 43

[56] References Cited

UNITED STATES PATENTS

| | | | |
|---|---|---|---|
| 2,338,603 | 1/1944 | Schultz | 269/309 X |
| 2,400,354 | 5/1946 | Jensen | 279/43 X |
| 2,620,196 | 12/1952 | Church | 279/4 |
| 3,084,928 | 4/1963 | Opitz | 269/21 |
| 3,542,354 | 11/1970 | Fitzpatrick | 269/22 |
| 3,729,185 | 4/1973 | Roeske | 269/20 |
| 3,729,966 | 5/1973 | Khoury | 29/569 X |
| 3,792,855 | 2/1974 | Bondie | 269/310 |

FOREIGN PATENTS OR APPLICATIONS

| | | | |
|---|---|---|---|
| 335,561 | 2/1959 | Switzerland | 269/21 |

*Primary Examiner*—Roy Lake
*Assistant Examiner*—Mark S. Bicks
*Attorney, Agent, or Firm*—William J. Dick

[57] ABSTRACT

A wafer transport apparatus to lock and hold a wafer in a predetermined contoured position while permitting transport of the wafer from the contouring apparatus to a remote location for further processing on the contoured wafer surface. The apparatus comprises a pallet having a plurality of pedestals therein, and vacuum cups at one extended end of the pedestals for supporting and gripping a wafer thereon. Means are provided to permit reciprocation of individual ones of the pedestals in the pallet, when the pallet is positioned in the contouring apparatus, and pedestal locks are provided to grasp and lock individual ones of the pedestals in an individually determinable position, while holding the pedestals in that position so that the pallet may be removed from the apparatus and positioned at some remote station.

4 Claims, 4 Drawing Figures

WAFER INTERLOCKING TRANSPORT SYSTEM

This is a division of application Ser. No. 309,408 filed Nov. 24, 1972, now U.S. Pat. No. 3,786,660.

SUMMARY OF THE INVENTION AND STATE OF THE PRIOR ART

The present invention relates to improvements in apparatus for contouring the surface of a thin element, and more particularly relates to apparatus which may be utilized in a contouring machine, locking the position of the element after it is contoured into a predetermined surface topography, and then removed from the contouring machine while maintaining the contour of the wafer so that processing may take place at a remote station, freeing the contouring machine for the contouring of another wafer.

In manufacturing integrated circuits, it is conventional to deposit a layer of photo resist material on the upper surface of a semiconductor wafer (the wafer usually being disc-shaped but this does not exclude rectangular, oval, or other configurations) and then expose the pattern through a mask onto the photo resist. To the naked eye the polished wafer appears to be extremely smooth and flat, but in fact the waviness of the wafer's surface oft times approaches 200 micro-inches. Additionally, the wafer may be bowed by as much as 0.02–0.04 inches. Because of the above, it has been conventional practice to place the semiconducter wafer into direct contact with the mask and then to apply pressure between the two in order to achieve coplanarity. Pressurized contact, in order to achieve coplanarity, is necessary to prevent exposure distortion of the lines on the wafer and thereby to reduce waste caused by bad product.

In the application of Rottmann and Khoury, Ser. No. 223,681 filed on Feb. 2, 1972, now U.S. Pat. No. 3,729,966, and disclosing "A Method and Apparatus for Contouring the Surface of Thin Elements", apparatus is disclosed for gripping a wafer (in the illustrated instance a semiconductor wafer), sensing the opposite surface of the wafer to determine the contour thereof, comparing the sensed surface contour with a predetermined or desired contour and then adjusting the surface gripped until the contour of the sensed surface is substantially the same as the desired contour. Thus, using apparatus which will permit flattening or contouring the wafer to some desired topographical form, obviates the necessity for pressing the photo mask against the wafer with great pressure in order to achieve coplanarity.

It has been discovered that there are many processing steps in the manufacture of integrated circuits and the testing thereof where it is desirable to have the wafer surface in the identical condition as the contour effected during the exposure operation. Accordingly, it has been desirable to place a number of wafer contouring machines, such as disclosed in the above identified patent application, in the semiconductor manufacturing line to achieve the desired contour (usually flat) of the wafer at the different operating steps.

To this end, it is a principal object of the present invention to provide an improvement in apparatus for contouring the surface of the wafer wherein the wafer support, carrier or pallet may be removed from the wafer contouring machine, while maintaining the wafer in its desired predetermined contour (usually flat) so as to free the machine for subsequent flattening operations using a separate wafer carrier.

Still another object of the present invention is to provide a novel wafer pallet which permits proper gripping and holding of the wafer, manipulation of the wafer to achieve a desired wafer contour in a wafer contouring machine, and removal of the pallet without effecting the contoured shape of the wafer.

Yet another object of the present invention is to provide a novel wafer carrier or holder in which the plurality of pedestals supporting and holding the wafer may be individually manipulated by the contouring machine; the pedestals then locked into the desired end position; and then the pallet removed from the contouring machine.

Other objects and a more complete understanding of the invention may be had by referring to the following specification and claims taken in conjunction with the accompanying drawings in which:

Figure 1:
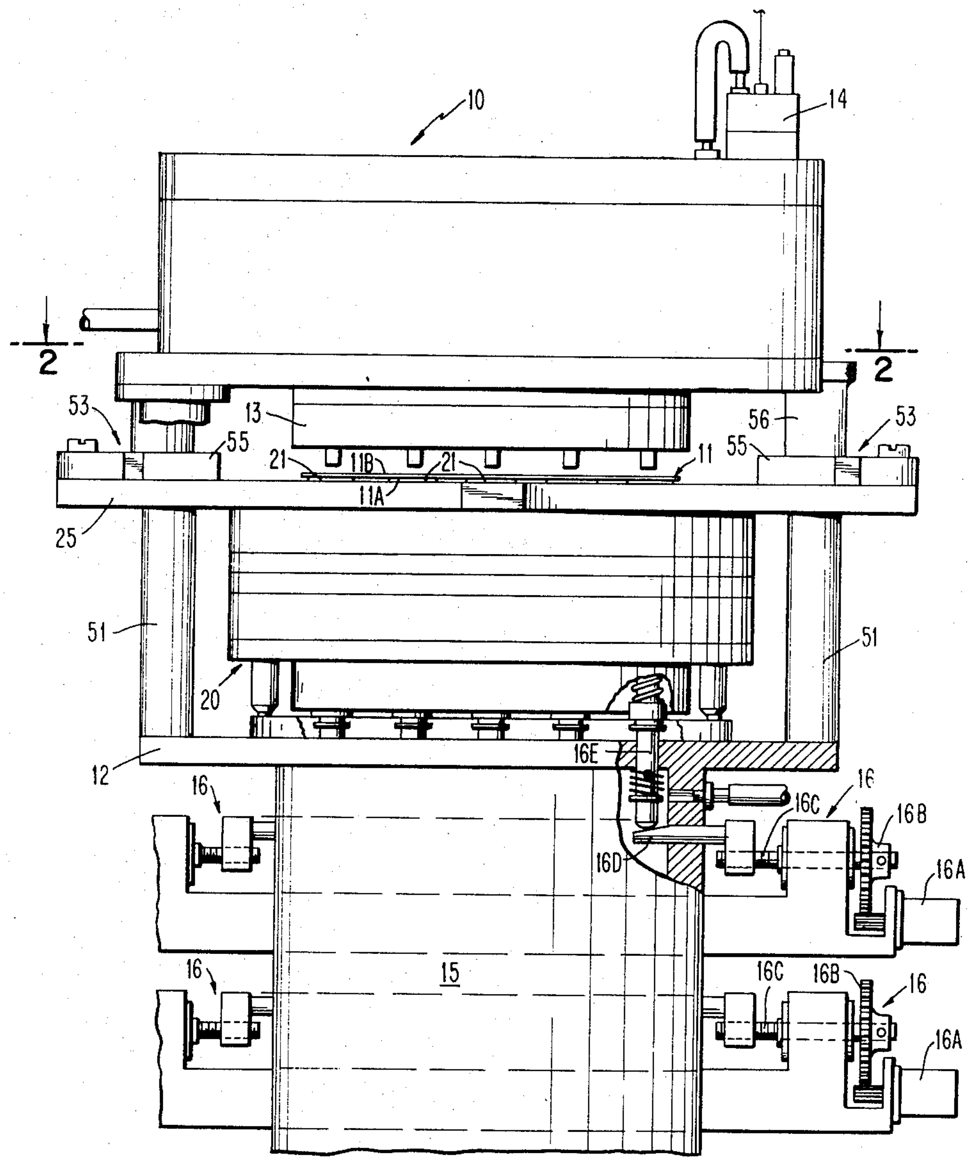
FIG. 1 is a fragmentary side elevational view of apparatus constructed in accordance with the present invention.

Referring now to the drawings and especially FIG. 1 thereof, apparatus 10 for contouring a surface of a thin element, such as a semiconducter wafer 11 is illustrated therein. Throughout the following description, it should be understood that by wafer is meant a thin element of any geometrical configuration having a surface which is to be contoured.

As fully described in the copending application of H. R. Rottmann and H. A. Khoury, Ser. No. 223,681 filed on Feb. 2, 1972, and assigned to the assignee of the present application, the pertinent parts of that application being incorporated by reference herein, apparatus for contouring a thin element is shown and described.

In accordance with the present invention, the apparatus comprises a pallet 20 which is releasably coupled to the frame 12 of the machine 10, and includes a plurality of individual wafer retaining means 21 for gripping or grasping, at selected places, a surface 11A of the wafer 11 and capable of reciprocating movement in the pallet 20 for contouring the opposite surface 11B of the wafer 11.

As set forth in the above identified Rottmann et al. patent application, facing the opposite surface 11B of the wafer but spaced therefrom is a plurality of sensing means 13 for sensing the contour or topography of the surface 11B of the wafer. Comparing means 14 are connected to each of the sensing means and are responsive thereto for comparing a desired contour or topography of the surface 11B of the wafer 11 with the actual contour of the surface 11B. Each of the sensing means 13 is connected through an associated comparing means 14 to manipulating means 15 for operation through the wafer retaining means for manipulating the surface 11A of the wafer 11. Each of the manipulating means to which the comparing means 14 is connected, comprises actuator means 16 which includes a stepping motor 16A, a step down gear 16B and screw 16C which effects reciprocation of a cam 16D for elevating and retracting a biased post 16E. Thus each of the comparing means 14 is connected to an individual actuator means 16 for elevating and retracting individual wafer retaining means 21 when the comparing means 14 indicates a difference between the desired contour and the actual contour of the wafer surface 11B. As disclosed in the aforementioned patent application, the wafer retaining means 21 grasps one side or surface 11A of the wafer at individual places therealong to individually elevate or retract at localized places thereon, by forcible distortion, the opposite surface 11B of the wafer thereby achieving a desired contour in response to the sensing, comparing and manipulating means.

In accordance with the invention the pallet 20 is made separable from the frame 12 of the machine 10 so as to enable contouring of wafers in a serial fashion, while permitting the removal from the machine of a contoured wafer for transport to a remote location without losing the predetermined and desired contour of the surface 11B of the wafer. To this end, and referring now to FIGS. 2 and 3, the pallet 20 includes the wafer retaining means 21, each of the retaining means comprising a pedestal 22 reciprocatably mounted in a bore 23 which passes through the pallet 20. In the illustrated instance each pedestal takes the form of a tubular shaft which terminates at its upper end in an annular suction disc 24 which extends above the upper surface 25A of a bed plate 25. At the lower end of each post or pedestal 22 is an enlarged portion 26 having a lower surface 26A adapted to engage the post 16E of the actuator means 16 (see FIG. 1). The lower end of the pallet 20 includes an annular depending flange 27 which forms a stand for the pallet and defines a space or the like 28 into which the lower enlarged portion 26 of the pedestals may extend. Intermediate the enlarged lower end 26 of each pedestal and the interior lower surface 29 of the pallet is biasing means, in the present instance comprising a compression spring 30 which tends to move the pedestal downwardly in the bore 23. To limit the downward travel of the pedestal due to the biasing action of the spring 30, a snap ring 31 is connected to the pedestal shaft adjacent the annular suction disc and is engageable with the upper surface 32 of the pallet.

Figures 3, 4:
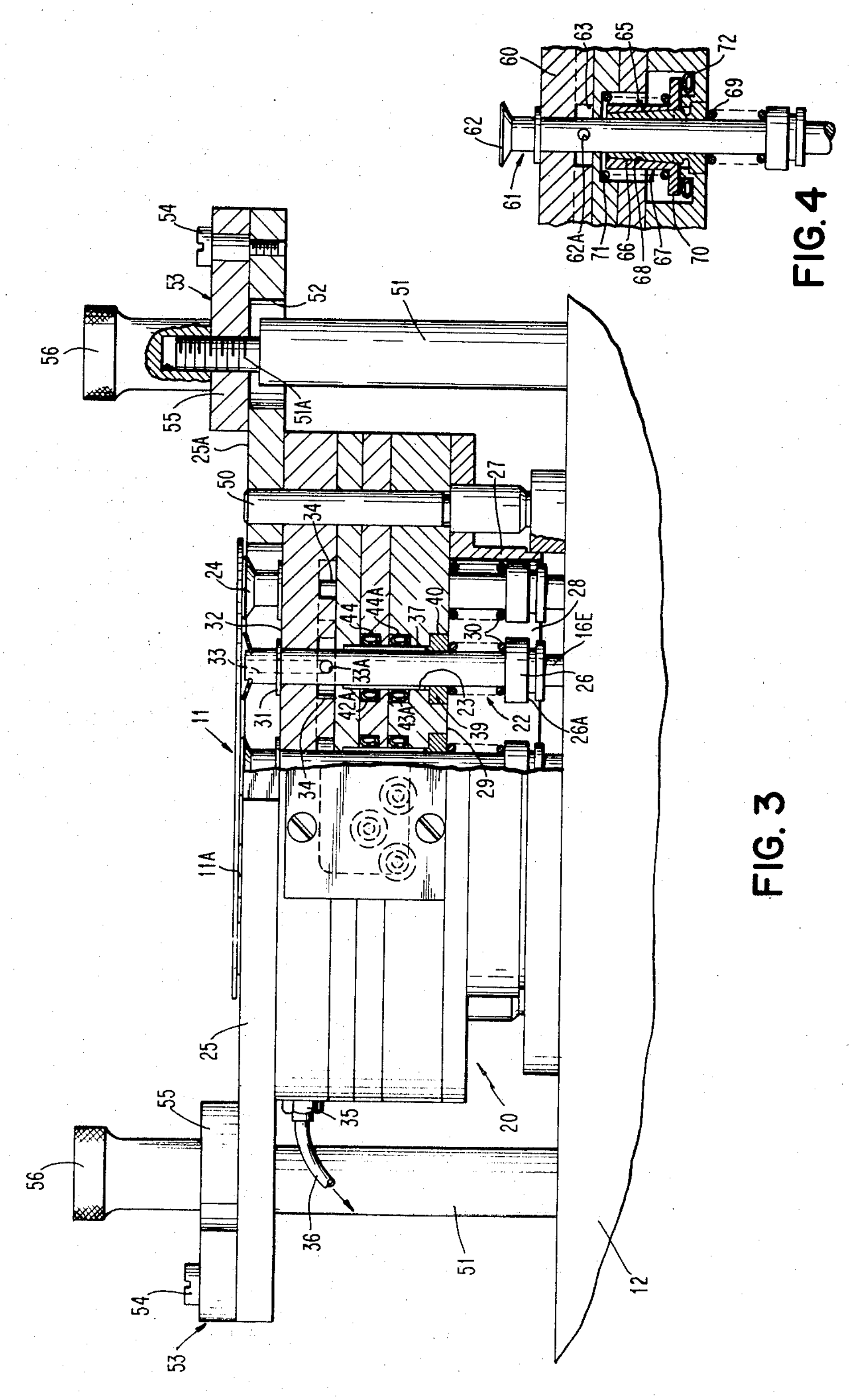
FIG. 3 is a fragmentary view in side elevation of the apparatus illustrated in FIG. 2.
FIG. 4 is a fragmentary sectional view illustrating an alternate embodiment of the means for locking a pedestal.

In order to firmly grip the lower surface 11A of a wafer 11, means are provided for applying a suction through each pedestal 22 to the annular suction disc 24 so as to firmly grasp or grip the wafer 11 thereto. To this end, and as best illustrated in FIG. 3, each pedestal is provided with a bore 33 therein which extends axially of the pedestal from the upper end thereof and terminates in an aperture 33A which is in fluid communication with a chamber or the like 34 which is coupled to a nipple 35 through which is applied a vacuum as by vacuum hose 36. The annular suction disc 24 of each pedestal serves as a seal permitting the grasping or gripping by each pedestal of a particular section or portion of the wafer mounted thereon. Inasmuch as the movement of the pedestal is slight, it is only necessary that the chamber 34 have a sufficient height that a suction may be drawn through the bore 33, terminal aperture 33A and suction hose 36.

After the wafer 11 has been contoured, it is desirable to lock the pedestals and thus the wafer into the determined contour so that the pallet may be removed. To this end, and referring now to FIGS. 2 and 3, each of the pedestals 22 includes a collet 37 which circumscribes the pedestal and includes a plurality of axially extending slots 38 in the wall thereof. An enlarged cylindrical base portion 39, which fits into a recess 40, in the body of the pallet 20, against which the biasing spring 30 presses, restrains axial movement of the collet. The section of the collet 37 having the slots therein is preferably relatively long and thin relative to the base portion 39 so as to permit the collet to act like the jaws of a chuck when radial pressure is exerted thereon.

In order to exert proper radial pressure upon the pedestal locking the collet 37 against the pedestal, the body of the pallet includes passageways therein, in the present instance identical superimposed spaced apart passageways 42 and 43 joining adjacent pedestals and circumscribing, with an enlarged passageway portion 42A, 43A the individual pedestals. Snaked through the passageways and substantially circumscribing each pedestal is an elastomeric, flexible, and a radially expansible tube 44 and 44A which is joined at its opposite ends to a manifold 45 for receiving fluid pressure, such as air, therein. The passages 42 and 43 overlie one another and are dimensioned so as to permit the elastomeric tubing to fit in close contact with the walls of the passage as well as against the wall of the enlargements 42A, 43A associated with each pedestal.

As noted heretofore, the collets 37 are fabricated of a relatively thin material and are dimensioned so to closely fit the exterior of the pedestal to permit sliding or axial reciprocation of the pedestal relative to the collets without excessive binding or excessive friction. Upon the completion of contouring of the wafer, fluid pressure is applied to the manifold 45 as through the hose 46 causing expansion of the tubing 44 and 44A causing the tubing to expand in the radial direction effecting a collapsing or camming of the walls of the collet radially against the pedestal tending to lock the pedestal in position.

Figure 2:
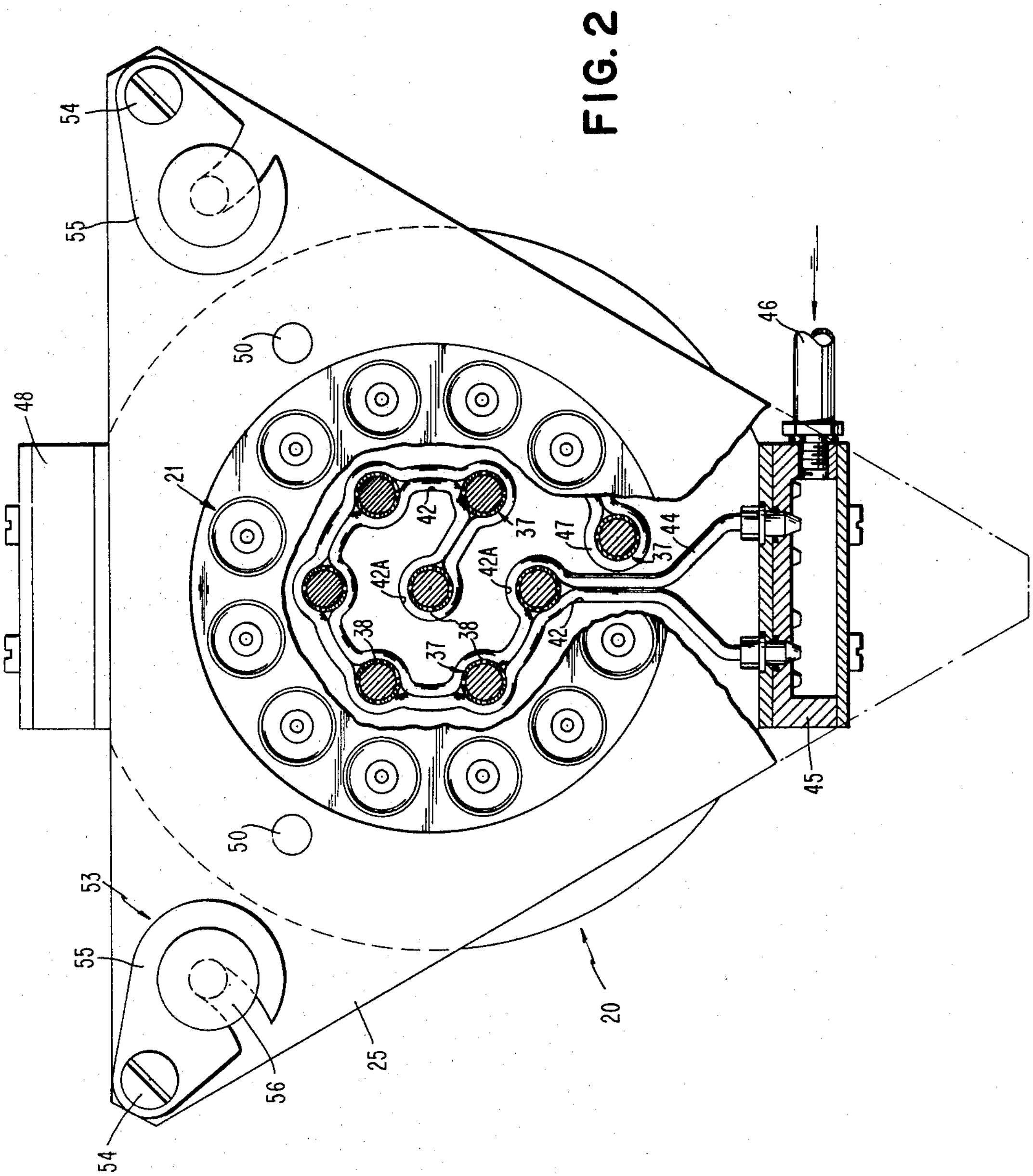
FIG. 2 is a fragmentary sectional view taken along line 2—2 of FIG. 1.

The second or lower tubing 44A provides a second parallel path for fluid and helps increase the locking force on the collet. While a single tubing path is sufficient for effecting a locking of the pedestals, it has been found that the second path, i.e. the tube 44A provides a measure of safety and insures full locking action of the collet against the shaft of the pedestal. Additionally, a separate or second circuit may be formed in the same level by providing a parallel path of tubing for locking, for example, one group of pedestals. This is illustrated in FIG. 2 where the peripheral pedestals are provided with a locking tube 47 which substantially circumscribes each peripheral pedestal and is supplied with a fluid from, for example, a manifold 48.

After the pedestals have been locked, the pallet may be disengaged from the flattening machine and moved to another station for processing of the wafer, freeing the machine 10 for the placement therein of another pallet and a contouring operation on another wafer. To this end and referring now to FIG. 3, the pallet is located relative to the base 12 of the machine as by dowels or dowel pins such as the dowel pin 50 illustrated in FIG. 3, the bed plate 25 of the pallet 20 cooperating with upstanding pillars 51 extending from the frame 12 and into and through bores 52, in the illustrated instance on opposite corners of the bed plate. To prevent inadvertent movement of the pallet during operation of the machine, clamping means are provided for clamping the pallet to the frame 12, in the illustrated instance the clamping means comprising a latch 53 pivoted on or about a pivot pin 54 and including a hook 55 which engages, in the present instance, a threaded end portion 51A of the pillars 51. Upon engagement of the hook 55 of the latch 53, a threaded nut 56 secures the latch 53 to the pillar 51. Reversing the above procedure permits removal of the pallet 20 from the frame 12 and allows for placement of the pallet at a remote location.

As may easily be seen, in order to insure proper locking of the wafer and holding of the wafer in its remote position, the hose 36 associated with the vacuum as well as the hose 46 associated with the pressure manifold 45 (and the hose connected to manifold 48) must be kept connected when the pallet is moved from the machine to its remote location. While the above described is the preferred embodiment, because it insures no motion of the pedestals even when the pallet is placed at some remote location, other locking means for the pedestals may be employed. For example, and referring now to FIG. 4, a portion of a pallet 60 is illustrated as having a pedestal 61 constructed identically with that heretofore described, and including a suction disc 62 which communicates through an aperture 62A and a bore in the pedestal with a chamber 63 for receiving vacuum. The pedestal locking means, in the illustrated instance, comprises a cam for engagement with the wall of a collet for actuating the cam between a first position for pressing the collet against the pedestal and a second position permitting movement of the pedestal in the collet. As shown in FIG. 4, the pedestal locking means includes a collet 65 having an inclined or sloped face 66 which cooperates with a cam, in the present instance a sleeve 67 having a reverse or complementary inclined or sloped face 68, and adapted to match the slope of the face of the collet. As illustrated, the pedestal 61 is biased downwardly as by a biasing spring 69, while the sleeve 67 includes a flanged portion 70 and a compression spring 71 which tends to cam or force the collet against the pedestal 61, i.e. into the first position. Underlying the flange 70 of the sleeve is a tube 72 which, during the vertical adjustment of the pedestal 61 is pressurized to effect elevation of the sleeve 67 freeing the collet from the pedestal 61. In this manner releasing pressure in the tube 72 allows the spring 71 to effect downward movement of the sleeve 67 causing a collapsing action of the collet against the shaft of the pedestal 61 and locking the pedestal in its predetermined position. Thus in the embodiment illustrated in FIG. 4, inasmuch as locking occurs absent pressure in the tubing 72, the pressure line 46 associated with the manifold 45 may be disconnected when it is desired to remove the pallet 60 from the machine.

Thus the apparatus of the present invention permits the placement of a pallet in a machine for contouring semiconductor wafers, the flattening or contouring of the wafer to take place, and then the locking of the pedestals to insure maintenance of the contour of the wafer when the pallet is removed and placed at a remote location for subsequent processing of the wafer.

Although the invention has been described with a certain degree of particularity, it is understood that the present disclosure has been made only by way of example and that numerous changes in the details of construction and the combination and arrangement of parts and the mode of operation may be made without departing from the spirit and the scope of the invention as hereinafter claimed.

What is claimed is:

1. A contoured wafer, transport apparatus, said apparatus comprising: a pallet having a plurality of pedestals therein, vacuum cups at one extended end of said pedestals for supporting and gripping a wafer thereon, and means for supplying a source of vacuum to said vacuum cups, means to permit reciprocation of each of said pedestals in said pallet, a passageway through said pallet surrounding a plurality of said pedestals, and locking means to lock individual ones of said pedestals in an individually determinable position, said locking means comprising, a collet circumscribing each of said plurality of said pedestals, each of said collets having at least one axially extending slit in the sidewall thereof; and means for restraining axial movement of said collet, at least one expansible tube means snaked in and through said passageway and substantially surrounding said collets associated with said pedestals, and means for applying a fluid pressure to said tube means to expand the same against said collets thereby decreasing the diameter of said collets and locking said pedestals in a predetermined position.

2. A contoured wafer, transport apparatus, said apparatus comprising: a pallet having a plurality of pedestals therein, vacuum cups at one extended end of said pedestals for supporting and gripping a wafer thereon, and means for supplying a source of vacuum to said vacuum cups, means to permit reciprocation of each of said pedestals in said pallet, a passageway through said pallet surrounding a plurality of said pedestals, and locking means to lock individual ones of said pedestals in an individually determinable position, said locking means comprising, a collet circumscribing each of said pedestals, each of said collets having at least one axially extending slit in the sidewall thereof; and means for restraining axial movement of said collet, said collet having an exterior wall portion, a cam for engagement with said wall, and means comprising at least one expandable tube means snaked in and through said passageway with means to supply fluid pressure thereto for actuating said cam between a first position for pressing said collet against said pedestal and locking said pedestal, and a second position permitting movement of said pedestal in said collet.

3. A contoured wafer, trarsport apparatus in accordance with claim 2 wherein said collet has a sloped exterior wall portion engageable by said cam.

4. A contoured wafer, transport apparatus in accordance with claim 3 wherein said cam comprises a sleeve having an interior wall sloped complementary to the slope of said collet wall, and biasing means pressing said sleeve into said first position, and means to overcome said biasing means to release pressure against said collet.

* * * * *